(12) United States Patent
Faigle et al.

(10) Patent No.: US 8,419,323 B2
(45) Date of Patent: Apr. 16, 2013

(54) METHOD FOR FINE-MACHINING CRANKSHAFTS AND MACHINING CENTER THEREFOR

(75) Inventors: Bernd Faigle, Nürtingen (DE); Wolfgang Marker, Linsenhofen (DE)

(73) Assignee: Gerbrüder Heller Maschinenfabrik GmbH, Nürtingen (DE)

( * ) Notice: Subject to any disclaimer, the term of this patent is extended or adjusted under 35 U.S.C. 154(b) by 1371 days.

(21) Appl. No.: 12/008,765

(22) Filed: Jan. 14, 2008

(65) Prior Publication Data

US 2010/0003098 A1    Jan. 7, 2010

Related U.S. Application Data

(63) Continuation-in-part of application No. PCT/EP2005/008083, filed on Jul. 22, 2005.

(51) Int. Cl.
*B23C 3/16* (2006.01)

(52) U.S. Cl.
USPC .......................................................... 409/132

(58) Field of Classification Search ............... 29/888.08, 29/557–558, 6.01, 34 R, 33 C, 888.1; 409/132, 409/163, 199–200, 165–166
See application file for complete search history.

(56) References Cited

U.S. PATENT DOCUMENTS

| | | | |
|---|---|---|---|
| 7,179,029 B2* | 2/2007 | Hemming et al. | 409/200 |
| 7,827,684 B2* | 11/2010 | Heimann et al. | 29/888.08 |
| 8,020,293 B2* | 9/2011 | Naumann | 29/888.08 |

FOREIGN PATENT DOCUMENTS

| | | |
|---|---|---|
| DE | 197 14 677 A1 | 10/1998 |
| DE | 197 49 940 A1 | 5/1999 |
| DE | EP 0 967 038 A | 12/1999 |
| WO | WO 96/39269 A | 12/1996 |

* cited by examiner

Primary Examiner — John C Hong
(74) Attorney, Agent, or Firm — R. S. Lombard; K. Bach

(57) ABSTRACT

A method and machine for machining shafts, such as crankshafts of an internal combustion engine wherein the shaft supported on a workpiece carrier rotatably about its axis and the carrier is movable relative to a milling tool adjustably supported on the machine, the bearing surfaces of the shaft are fine-machined by a milling tool taking into consideration the resiliency and the bending of the shaft by the engagement force of the milling tool during fine cutting of the bearing surfaces in the various angular rations of the shaft and the axial bearing location between the shaft ends so as to provide for a perfect final round cutting of the bearings without the need for wet grinding. The fine machining is preferably achieved by dry machining and orthogonal rotational milling, all main bearings and lifting bearings being machined in a single clamping from the rough machining dimensions to the final dimension. For a second machining sequence, some of the main bearings and lifting bearings are used as clamping surfaces.

53 Claims, 9 Drawing Sheets

METHOD FOR FINE-MACHINING CRANKSHAFTS AND MACHINING CENTER THEREFOR

CROSS-REFERENCE TO RELATED APPLICATION

This is a continuation-in-part application of pending international application PCT/EP2005/008083 filed Jul. 22, 2005.

BACKGROUND OF THE INVENTION

The invention relates to a method and machine for fine machining shafts such as crankshafts with center bearings and eccentric bearings which are both machined in a single machining setup.

As summarized in DE 197 14 677 C2, crankshafts are conventionally often manufactured in a method whereby material was removed from the bearing locations of the originally formed, that is cast or forged, crankshaft in three subsequent machining procedures. The first machining step involved a rough cut with a geometrically determined cutting shape. Various processes were used herefor such as form cutting, milling, inside milling, outside milling etc. The material removal is in the millimeter range. The desired bearing diameters are formed with an excess diameter of a few tenths of a millimeter.

This step is generally followed by hardening procedure, in which the crankshaft is thermally tempered, rolled or otherwise treated. This step is followed by fine machining wherein particularly the main bearings and the lift bearings are ground down to the desired dimensions. During this procedure, a material amount in the area of one tenth of a millimeter is removed. Following this step, only finishing procedures are performed for generating the desired surface quality.

The above roughly described machining procedure was generally considered to have the disadvantage that it required grinding. During grinding a cooling lubricant must be applied whereby the removed material particles are wetted and forms a grinding mud. This grinding mud is problematic and must be disposed of which increases costs. With Cubic Boron Nitride grinding, known as CBN grinding, the danger of an explosion exists. In addition, large amounts of cooling lubricants are required. Still the workpieces are easily overheated.

Based hereon DE 197 14 677 C2 proposes to replace the grinding procedures by machining procedures using geometrically determined cutting edges, particularly circumferential milling or twin milling using high speed milling cutters. This procedure was to be performed without lubricating coolants (dry). During this milling procedure a surface roughness with a characteristic roughness value Ra of preferably less than two micrometers was to be generated. With this process, the support area of the bearing surface at the transition to fine machining was expected to be less than 50% and particularly less than 25% of that present after the finishing step.

Also, DE 197 49 940 A1 is concerned with elimination of the grinding step during the manufacture of crankshafts. It proposed to perform the cutting step with the geometrically determined cutting edge with such an accuracy that roundness deviation is less then ten micrometers, the diameter deviation is less than 100 micrometers in the form of positive deviation based on the desired contour after finishing and the roughness is less than two micrometers. These values are based on the requirements of the finishing process which does not allow any substantial geometry changes or dimension changes of the workpiece, but which may only affect the surface quality.

If during fine machining, a transition occurs from machining processes with a geometrically undefined cutting area that is with grinding procedures, to machining processes with geometrically determined cutting edges, that is, for example, milling procedures this in itself does not mean that the efficiency is improved. Although, even multiple cranked crankshafts of complicated multi-cylinder engines, such as, for example, V6, V8, W8, V10, V12 and W12 truck or passenger car engines are stable and rigid components, it is common practice to support the crankshaft during machining near the area which is momentarily machined, for example, by a steadying member in order to compensate for different rigidities of the camshaft in different directions or at different bearing location. The use of such-steadying members, however, is time-consuming since they must be replaced during the machining process.

As crankshaft materials are very strong steels or a casting materials such as CrMo 4 or casting iron with graphite spheres such as GGG 60, GGG 70, or GGG 80 are used because of the increasing torques to be transmitted. Occasionally, even manganese-silicon steel alloys are used. With such materials the machining sequence on the process control are very important. For example, to avoid excessive operating pressures, grinding procedures may be divided into several individual machining steps wherein each is performed with less material removal. For example, pregrinding and finish grinding is performed on different machines, the number of the revolutions in the machines is increased and/or in each machine is changed from the machining of sets to individual machining. During machine cutting with a geometrically determined cutting edge, however this is not possible. Rather, particularly during cutting of tough materials a minimum sharing thickness must be maintained whereby the workpiece is subjected to a substantial load.

In addition, cutting edges of a milling tool which periodically engage the workpiece during machining can cause the camshaft to vibrate so that bevels may be formed and which result in dimension deviations.

Although occasional attempts have been made to eliminate the grinding of crankshafts and to achieve the fine machining of crankshafts by milling procedures such procedures have not been used in large volume manufacturing because of difficulties with repeatability. Furthermore, it has strangely been found that the milling tools wear very rapidly.

It is therefore, the object of the present invention to provide means for the accurate fine machining of crankshafts with tools having a geometrically defined cutting edge.

SUMMARY OF THE INVENTION

A method and machine for machining shafts, such as crankshafts of an internal combustion engine wherein the shaft supported on a workpiece carrier rotatably about its axis and the carrier is movable relative to a milling tool adjustably supported on the machine, the bearing surfaces of the shaft are fine-machined by a milling tool taking into consideration the resiliency and the bending of the shaft by the engagement force of the milling tool during fine cutting of the bearing surfaces in the various angular ratios of the shaft and the axial bearing location between the shaft ends so as to provide for a perfect final round cutting of the bearings without the need for wet grinding. The fine machining is preferably achieved by dry machining and orthogonal rotational milling, all main bearings and lifting bearings being machined in a single clamping from the rough machining dimensions to the final dimension. For a second machining sequence, some of the main bearings and lifting bearings are used as clamping surfaces.

With a first mounting, the roughly machined camshaft or crankshaft is fine-machined for the first time. In the preceding rough machining, the camshaft or crankshaft may have been roughly cut to an oversize of a few tenths of a millimeter so that it is relatively accurately pre-machined. For rough machining particularly milling cutters or turbulence milling procedures or twin cutting processes may be used. The camshaft or crankshaft may have been ball-blasted or rolled. Furthermore, the camshaft or crankshaft may have been subjected to a thermal hardening procedure wherein, like in the rolling procedure, a certain distortion may occur.

The first machining procedure is performed with the shaft mounted without additional supports. The shaft is, in this case, engaged at opposite ends by mounting tips which extend, for example, into a flange bore and an opposite shaft end bore which is at least roughly pre-machined. In the first mounting, the shaft is preferably rotatably supported. In addition to the centering support by the tips, the shaft may be engaged by a chuck or it may be engaged at both ends so that it can be rotated in a controlled manner and moved to certain angular positions. In such a mount, at least the first and the last of the outer bearings are machined and preferably all the center bearings (main camshaft bearings) and also the eccentric bearings (crank bearings in connection with crankshafts). Herein generally circular cylindrical surfaces are involved. In connections with camshafts, the eccentric bearings are cylindrical surfaces with non circular cross-sections. However, optimally also onto these cylindrical surfaces subsequently planar surface areas can be fine machined by cutting (lift areas, oil flange, etc.). The machining occurs on the basis of drawing dimensions, but in any case to an accurate shape. The central and eccentric bearings (main and crank bearings) are therefore manufactured to the desired diameter with a small excess rise which is removed during superfinishing (also called micro-fine milling). In the first machining procedure with the green mounting additional functional surfaces, such as the fit bearing and the flange diameter may be fine machined.

When the shaft is machined this far, it is transferred to a second machining center where it is subjected to a final fine machining. Herein fine machined cylinder surfaces serve as reference surfaces for the mounting of the crankshaft. For example, in the case of a crankshaft, main bearings, preferably the first and the last main bearing are used as mounting areas. For machining the crankshaft in specific angular positions, one or several crank bearings may serve as reference areas. For example, the main bearings used as reference areas are supported by prism-clamping systems. The crank bearing used for angular position reference abuts a supports surface or is clamped thereto. Alternatively, the angular position reference may be obtained by contacting a crank bearing by a measuring sensor. It is also possible to mount the shaft independently of the excess dimension in a center position. In the second mount preferably at least flange bores, the needle bearing bores and the shaft end bore are machined. Also the flange diameter and the shaft end outer surface may be machined to the accurate diameter.

The crankshaft is mounted preferably without relative movement between the clamping surface and the cylindrical surface serving as reference surface in order to avoid the forming of clamping works on the already fine-machined cylindrical surfaces. In the second mounting, in the second machining center, for example, the flange and the shaft end bores, the needle bearing bores and the outer shaft end surfaces are fine-machined. This may be done, for example, by circular milling.

In the work process described, the station times for the first machining procedures and the second machining procedures are about the same which results in an about uniform machine utilization. If the station times are different in subsequent manufacturing groups different numbers of machining centers may be used. Furthermore, the main and crank bearings accurately machined in the first machining procedures serve as reference surfaces for the following machining steps. This avoids the occurrence of measuring error claims and provides for a simple one-stage realization of the dimensions as determined by the manufacturing drawings. The crankshaft is mounted in accordance with the dimensions and reference values as given in the manufacturing drawings. For example, the position of the needle bore is indicated with reference to the first main bearing at the flange. Since the main bearing surface serves as mounting and reference surface for the manufacture of the needle bore, a system-caused dimensioning deviation is basically not possible.

With the division of fine-machining procedures into a first machining succession for main shaft bearings and crank bearings and possibly for lapped bearings, stop surfaces and flange diameters and a second machining succession for flange and shaft end bores and shaft end outside diameter each functional surface can be machined in a single machining procedure in accordance with the manufacturing drawings, that is, without re-mounting of the shaft, which improves the machining quality and accuracy. The determination in which mounting setup, that is in which machining center the respective flange and outer shaft end surfaces are machined can be decided for each particular case. It depends on the type of crankshaft to be machined.

In the fine-machining, particularly in the first machining succession preferably medium cutting speeds of 300 m/min to 400 m/min (meters per minute) are used. For the machining of hardened shafts cutting speeds of more than 1000 m/min preferably more than 1500 m/min can be used. Furthermore, care should be taken that at no place the cutting speed is below 20 m/min. If for the fine-machining an orthogonal milling cutting is used, this applies correspondingly for the radially outer as well as the radially inner end of the cutting edge.

Care must be taken that a maximum average cutting thickness of, for example, 0.1 millimeter is not exceeded. In this way, the cutting force is limited to a relatively low value and the machining accuracy is increased. Preferably, however, also a minimum cutting thickness of 0.01 millimeter, at least 0.005 millimeter should be maintained, in order to minimize tool wear.

It is considered to be advantageous if the fine-machining that is the material removal is completed in no more than three, preferably only two or only one turn of the crankshaft. This is important particularly for shafts such as crankshafts of ductile steel whereby the desired surface quality can be obtained with lower tool wear. In connection with crankshafts, which are machined without or with a reduced amount of support structures, it may be expedient to complete the fine-machining of a main bearing or of a crank bearing in two turns. Because of the dependency of the generally very high rigidity of a crankshaft on the angular position with respect to milling tool axis the crankshaft may slightly yield during fine-machining in a radial direction which may result in cylindrical bearing surfaces which are not truly round. This can be corrected in the second turn, if it occurs systematically and is verified by measurements by adjusting the relative position between the operating spindle and the crankshaft in accordance with the respective angular position of the crankshaft. If, in this way, accurately dimensional fine-machined main bearings and crank bearings are produced, the milling of the bearings can be completed in one turn based on the same crankshaft angle—dependent distance adjustment between the operating spindle and crankshaft. If small systematic deviations still occur, the respective diameter deviation can be recorded and with a corresponding control counter action the distance adjustment can appropriately compensate.

The dimensions can be measured on each camshaft or crankshaft or only randomly on several camshafts or crankshafts or only during an initial adjustment period. If from the measured roundness deviations, an expectation value for the roundness deviations is formed and its deviations are not excessive a compensation as described above is possible. The roundness deviation to be expected and the corresponding compensation measures are preferably determined separately for each main bearing and each eccentric or crank bearing. They are caused by the individual rigidity of the crankshaft with respect to loads at the particular bearing and, therefore, may be different. The separate determination of the roundness deviations makes it possible to precisely fine-machine all the bearings.

Preferably, a main bearing as well as a crank bearing is fine-machined over the full length in a single machining step. If the bearing surface is formed by a milling procedure wherein a milling tool with an axis of rotation extending transverse to the shaft, the diameter of the milling tool that is the diameter of the circle defined by the outer cutting edge corner of the milling tool corresponds essentially to the length of the eccentric bearing. If excess cuts are made adjacent the cylindrical bearing surface of the eccentric bearing or the main bearing the widths of the excess cuts forms a tolerance permitting a somewhat smaller or larger diameter of the milling tool within that tolerance range.

It is also possible to machine with the milling tool at the same time also the side surfaces adjacent the crank bearing and the main bearing. These are planar surfaces adjacent the cylindrical main or crank bearings. Furthermore, it is possible to provide for a certain safety distance adjacent these surfaces by choosing a milling tool with a slightly smaller diameter than the distance between the opposite planar surfaces at the ends of the bearing cylinder. Preferably, however, the cylindrical surface of the main bearing or of the crank bearing is machined all together without a change in the adjustment of the position of the cutting tool and the crankshaft with regard to the axial direction of the crankshaft. This avoids the foundation of breaks and steps on the fine-machined, milled bearing surface. Alternatively, an axial relative adjustment may be initiated in such a way that the axis of the milling tool with respect to the cylinder surface marks a spiral line.

The fine machining is preferably performed up to such a maximal roundness deviation which is approximated to the drawing dimensions by a material removal as acceptable for providing a super-finish. In this way using the milling process the roundness required for the final finishing treatment (super-finish) can be achieved. In addition an average roughness of, for example, less than five, preferably less than two micrometers is obtained.

It is desirable to provide a bearing surface which has in the central annular area a greater roughness than in the axial end areas. This provides for support parts and oil retaining capabilities expediently also after the subsequent finishing treatment. For simple applications, the super-finish may be omitted. Preferably the roughness is in a selected surface area, for example, the annular center area is at least twice as large as in the other, for example, the axial end areas.

For influencing the roughness, for example, for increasing the roughness in the axial end areas or, respectively reducing the roughness in the center areas it may be expedient to reduce during the orthogonal milling machining the clearance angle at the front face cutter toward the milling center possibly up to a value of zero, in order to provide at the cutting edge different radially inner and radially outer cutting conditions. If the surface area of the cutter without cutting edges slides over the machined bearing surface area, that surface area may be further smoothened. Vice versa, the roughness in a bearing center area may be increased, if the clearance angle at the respective cutting edge areas is increased. Additionally, the roughness in the center area of the bearing may be increased by reducing the cutter radius offset V.

By a combination of surfaces areas of different roughness optimal support properties and oil retaining capabilities can be combined.

The fine-machining is performed in the first or in the second machining sequence, preferably using a cutting edge guided in a plane. The milling machining in this case, is performed in an orthogonal orientation wherein the axis of rotation of the milling tool, which at its front end is provided with at least one, but preferably several cutting edges, is oriented at a right angle to the longitudinal axis of the shaft, so that the milling tool cuts over almost its whole diameter. The cutting edges of the milling tool are disposed herein in a plane. But it is also possible to arrange them front end cutting edges of the milling tool along a conical surface which is concentric with the axis of rotation wherein the opening angle of such a cone is greater than 170° (degrees), that is, for example, 175° or slightly more.

In accordance therewith the axis of rotation of the milling tool is then inclined by some degrees with respect to the axis of rotation of the shaft. The milling tool herein operates only with half its diameter or slightly less. The cylindrical bearing surface is consequently machined only over half its length. In a second pass with the milling cutter inclined in the opposite sense then the other half of the cylindrical bearing surface can be machined. This can be done with the same milling tool or with another milling tool which rotates, for example, in a direction opposite to that of the first milling tool. In this way, both halves of the cylindrical bearing surface can be machined under the same cutting conditions, that is, both in the direction of movement of the surfaces being cut or both in the opposite direction.

For the machining of the adjacent planar surfaces, a milling tool with circumferential cutters is used. Herefor the milling cutter machines only at one side. The other side is machined in a second pass with the cutter rotating in the opposite sense. This can be done with the same cutter or another milling cutter which rotates in a direction opposite to the first milling cutter. In this way, both planar surfaces can be machined under the same cutting conditions, that is, both in the direction of movement of the surfaces being cut or both in the opposite direction.

Furthermore, it may be expedient to incline the milling tool slightly with respect to the rectangular orientation, for example, only by a few angular minutes in order to compensate, for example, for small deformations of the crankshaft during machining. This can also be achieved by an inclination of the crankshaft. This inclination is preferably not constant for a turn of the crankshaft, but is dependent on the angular position of the crankshaft so as to accommodate different rigidities of the crankshaft in different radial directions.

Instead of the orthogonally oriented milling tool with cutting edges at the front, an internal round cutter or an external round cutter may be used. Their diameters are in each case so dimensioned that the cutting edge extends essentially in a plane over the engagement or cutting length.

The diameter of the cutting edge travel circle is, for example, clearly in excess of 200 millimeters whereas the length of the material piece is at most one millimeter. Herein preferably single cutting edge cutters are used. It has been found that in this way an undesirable level formation of the machined cylindrical surfaces can be avoided or at least minimized.

The machining is preferably so performed that for the fine machining over the cylinder circumference at least 1000, but preferably more than 2000 cutter engagements occur. No bevel formation is then noticeable. The theoretically present waviness upon transfer to super-finishing is preferably less than 0.5 micrometer and particularly preferably less than 0.15 micrometer that is less than the roughness and, consequently, practically non-existent. In addition, the angle deviation of the cylindrical surface of the bearings after finish-machining with a geometrically determined cutting edge is smaller then prescribed by the drawings, for example, less then 0.1 of a degree. This can be achieved particularly also with somewhat less rigid, for example, relatively long crankshafts or camshafts without intermediate support members by the slight inclination of the shaft during fine machining as mentioned earlier.

The fine machining is preferably so adjusted, that within the frame of the manufacturing accuracy exactly cylindrical bearing surfaces are produced even if the drawing prescribes slightly convex or concave embossing. Those surfaces are formed in the subsequent super-finishing if they are less than 30 micrometers. If a concave embossing is called for the roughness generated during fine machining in the central annular area is selected to be rather large in order to facilitate the subsequent material removal in this area.

If the cylinder surfaces (circular cylinder or cam surfaces) are machined using a front end cutter or by orthogonal milling, between the axis of rotation of the cuter and the shaft axis preferably an axis offset of, for example, several millimeters is adjusted. With this offset of the axes, the roughness distribution on the machined main or crank bearings can be influenced in a desired way. If no or only small roughness differences are desired, this axis offset is increased. The axis offset can also be varied while the crankshaft is turning in order to generate the desired roughness distribution. The offset of the axes is preferably so adjusted that the axis of rotation of the milling cutter that is its center of rotation is outside the shaft.

It has been found to be advantageous for the accuracy of the machining of the camshafts and crankshafts by way of orthogonal milling, if the shaft remains centrally under tension during the machining of the main and the crank bearings. For machining eccentric or crank bearings, the work spindle may be moved transverse to the camshaft or crankshaft up and down in synchronism with the rotation. In addition, the camshaft or crankshaft can be moved toward, and away from, the operating spindle. The movements follow herein, each time a sine or cosine function are supposed on the circular orbital movement of the cylindrical crank bearing. With respect to the machine base serving as a reference system, the crank bearing moves, during the milling movement therefore only up and down. This movement is followed by the operating spindle. In addition, on these sine and cosine movements in each case a small compensation movement may be superposed which may be needed to compensate for a bending of the crankshaft or to generate a particular desired roughness profile. This is also true for the machining of the camshaft where the movements of the cam shape are superposed.

The rotational speed of the milling tool is at least 500 times and preferably at least 1000 times the speed of the camshaft. Furthermore, it is preferably so set that the periodic cutting edge engagement with the surface being cut does not cause any vibration of the shaft that is that it is outside the characteristic frequency. In this connection, it may be considered to provide several cutting edges at the front side of the milling tool at irregular angular distances. Also this measure can reduce vibrations.

The method described herein is performed on one but preferably on two correspondingly equipped machining centers which are equipped with two carriages movably supported on the center base in parallel spaced relationship. They are linked to a workpiece support structure which preferably includes a load compensation device. The two linearly movable carriages can be moved and controlled independently of each other whereby the crankshaft can be pivoted with regard to a work spindle. This feature can be used for an angle compensation of flexible bending of the crankshaft during machining. It is furthermore, useful for the cutting of inclined bores such as oil supply bores, relief bores or similar endeavors.

The machining is preferably dry-machining. In accordance therewith, the machining center is preferably enclosed in a dust-tight manner.

The invention and advantageous features thereof will be described below with reference to the accompanying drawings showing a particular embodiment.

DESCRIPTION OF THE PREFERRED EMBODIMENTS

Figure 1:
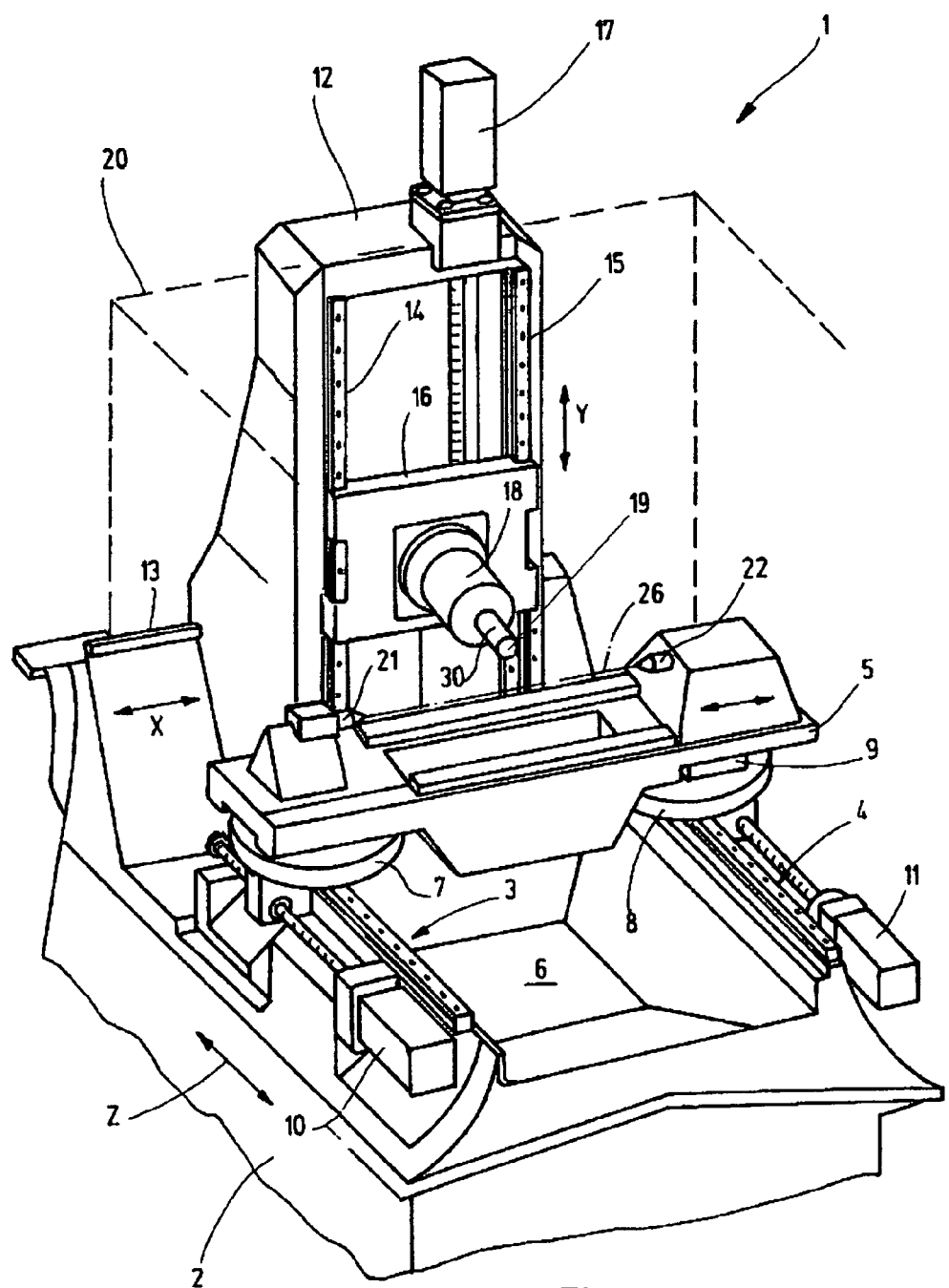
FIG. 1 shows a machining center in a simplified perspective view.

FIG. 1 shows a machining center 1 which comprises a machine base 2 with two linear guide tracks 3, 4 arranged in parallel spaced relationship for supporting a tool carrier 5.

The two linear guide tracks 3, 4 which delimit therebetween a chip collection chamber 6 carry each a linearly movable carriage 7, 8 each of which is rotatably connected to the workpiece carrier 5. At least one of the carriages 7, 8, in the embodiment shown the carriage 8 includes a length compensation arrangement permitting a longitudinal movement of the workpiece carrier 5 with respect to the carriage 8.

The linear guide tracks 3, 4 are provided with control motors 10, 11 which can be operated independently for linearly moving the carriages 7, 8. The control motors 10, 11 can be controlled independently from a central machine control unit in order to move the workpiece carrier in a parallel manner or also to pivot it about a vertical axis. The movement direction provided by the linear guide arrangement 3, 4 is designated in the shown embodiment as the Z-direction.

On the machine base 2 a machine stand 12 is supported so as to be movable, by a transverse guide arrangement 13 in X-direction transverse to the Z-direction. For the position adjustment of the stand 12, a servo-drive is provided which however is not shown in the drawings. At the side facing the workpiece carrier 5, the stand 12 is provided with vertical guide structures 14, 15 which support a tool carrier 16 so as to be movable in a vertical Y-direction. For moving the tool carrier 16, a servo-motor 17 is provided. The tool carrier supports a machine spindle 18 which can be driven for rotation about a machine spindle axis 19. The machine base 2 may also be provided with at least one additional machine spindle having an axis of rotation extending parallel to the shaft axis (26).

The machine center 1 is enclosed by a housing 20 which is only indicated by dashed lines and which is at least tight enough that chips formed during cutting operations are not thrown out of the workpiece surrounded by the housing.

Figure 2:
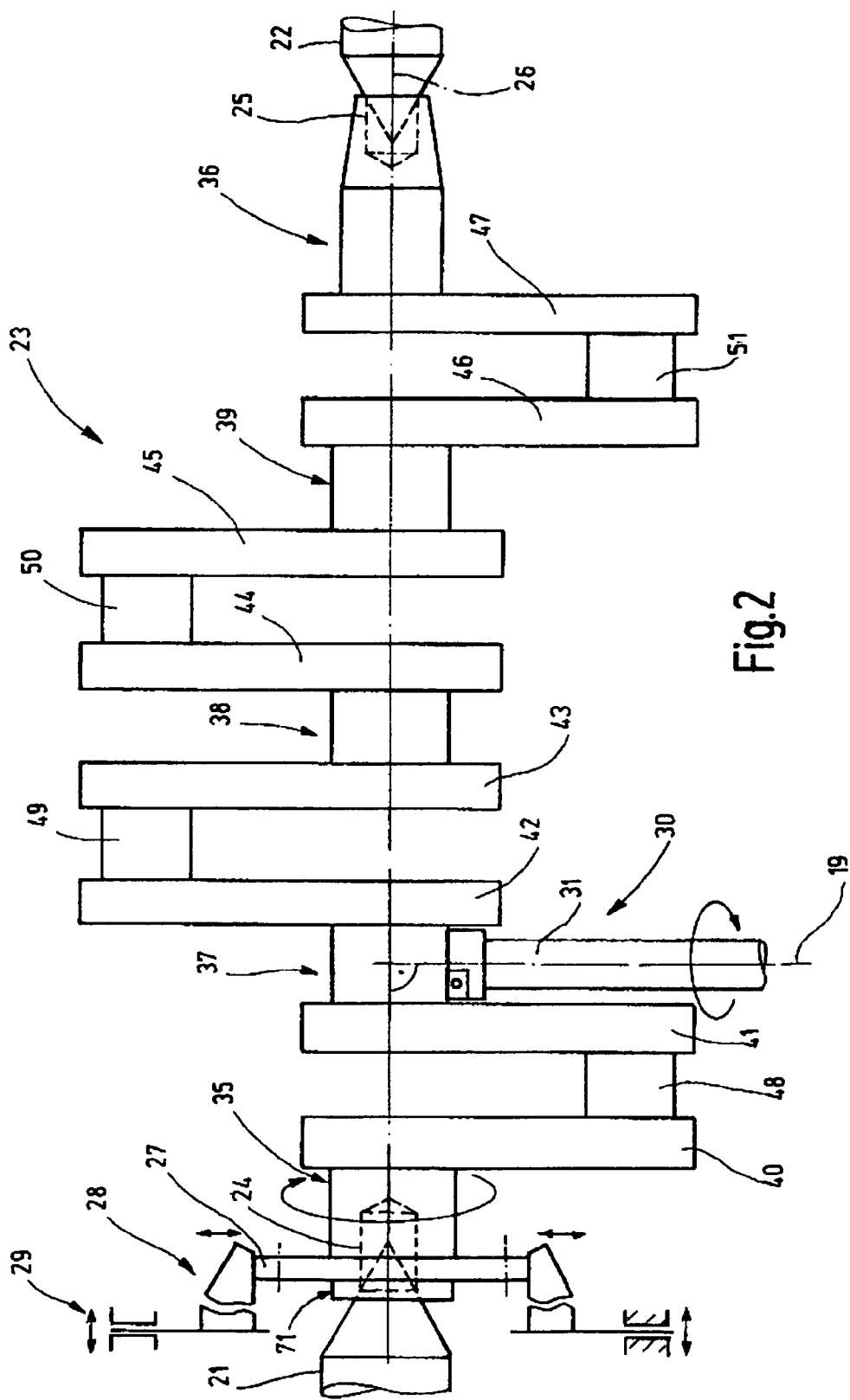
FIG. 2 shows schematically a crankshaft in a first mounting arrangement for performing a first machining procedure.

In this basic design, the machine center 1 can be used for performing a first machining sequence for the fine machining of main bearings and crank bearings of a crankshaft and also for performing a second machining sequence for machining flanges and end portions of a crank shaft. In the first case, it is used as a first machining center 1 for machining a shaft 23, such as a crankshaft, which is shown in FIG. 2 schematically only supported by the tips 21, 22 disposed on the workpiece carrier 5 and supporting the crankshaft 23 by engagement in the end bores 24, 25. At least one of the tips, as shown in FIG. 1, the tip 22 is movable toward and away from the other tip 21. To this end the workpiece carrier 5 is provided with corresponding tracks as indicated.

The end bores 24, 25 are conically expanded at their ends for accommodating the tips 21, 22 and accurately positioning the crankshaft 23 between the opposite tips 21, 22. The crankshaft axis 26 then extends centrally through the tips 21, 22 and is oriented in the longitudinal direction of the workpiece carrier 5 that is generally in the X-direction. In addition, the crankshaft 23 may be engaged for example at its flange 27 by a chuck 28 which after the centering of the crankshaft between the tips 21, 22 is firmly clamped to the flange 27 by a coupling means 29 for rotation by a rotational positioning unit which is also arranged on the workpiece carrier 5. In this way, the crankshaft is radially centered supported and can be rotated during machining in a controlled manner and to certain rotational positions.

The machine spindle 18 carries a milling cutting tool 30 such as in the form of a front face cutter 31 (FIG. 3) which at its front face is provided preferably with several cutting edges 32, 33. The cutting edges 32, 33 are arranged in a common plane 34 indicated schematically in FIG. 6 which plane extends at a right angle to the spindle axis 19. Alternatively, the fine machining occurs by milling using the milling tool (30) with at least one cutting edge (32) which is disposed on a conical surface which is concentric with the axis of rotation. Preferably the cone angle is greater than 170°, preferably greater than 175°.

Figure 5:
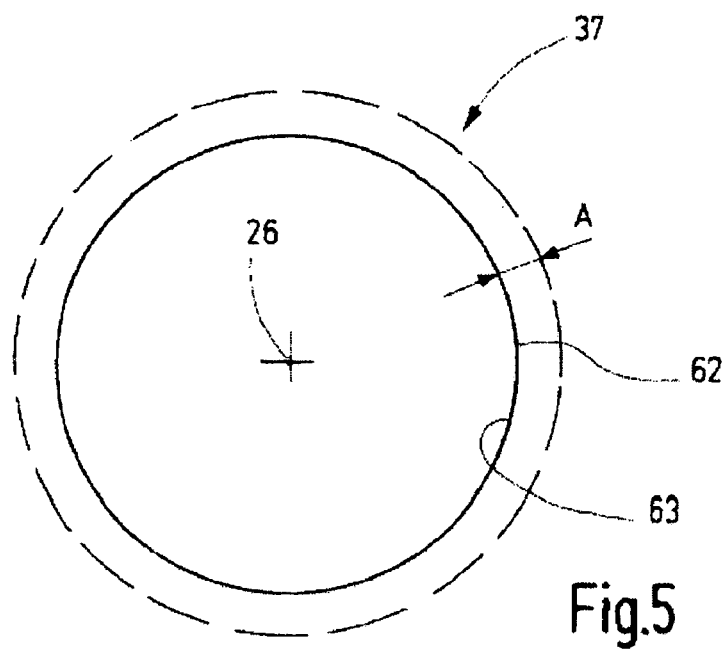
FIG. 5 shows the bearing according to FIGS. 3 and 4 indicating the excess size highly exaggerated.

The crankshaft 23 comprises at least a first and a last main bearing 35, 36 and additional main bearings 37, 38, 39 which are arranged co-axially with the crankshaft axis 26 and which have been rough-machined in an earlier machining process. They are essentially cylindrical and have dimensions in excess of the desired dimensions by an amount of a few tenths of a millimeter. Between the crank flanges 40, 41, 42, 43, 44, 45, 46, 47 cylindrical crank bearings 48, 49, 50, 51 are arranged eccentrically with respect to the crank shaft axis 26. FIG. 5 (as well as FIGS. 7 and 8) show crankshafts for four cylinder four cycle engines for the explanation of the machining sequence. The machining of more complicated crankshafts of engines with more than four cylinders which are longer and have multiple cranks and may have a crank bearing displacement (for example V6 or V10 engines) and which, as a result, are relatively resilient, that is flexible in a radial direction.

Figure 7:
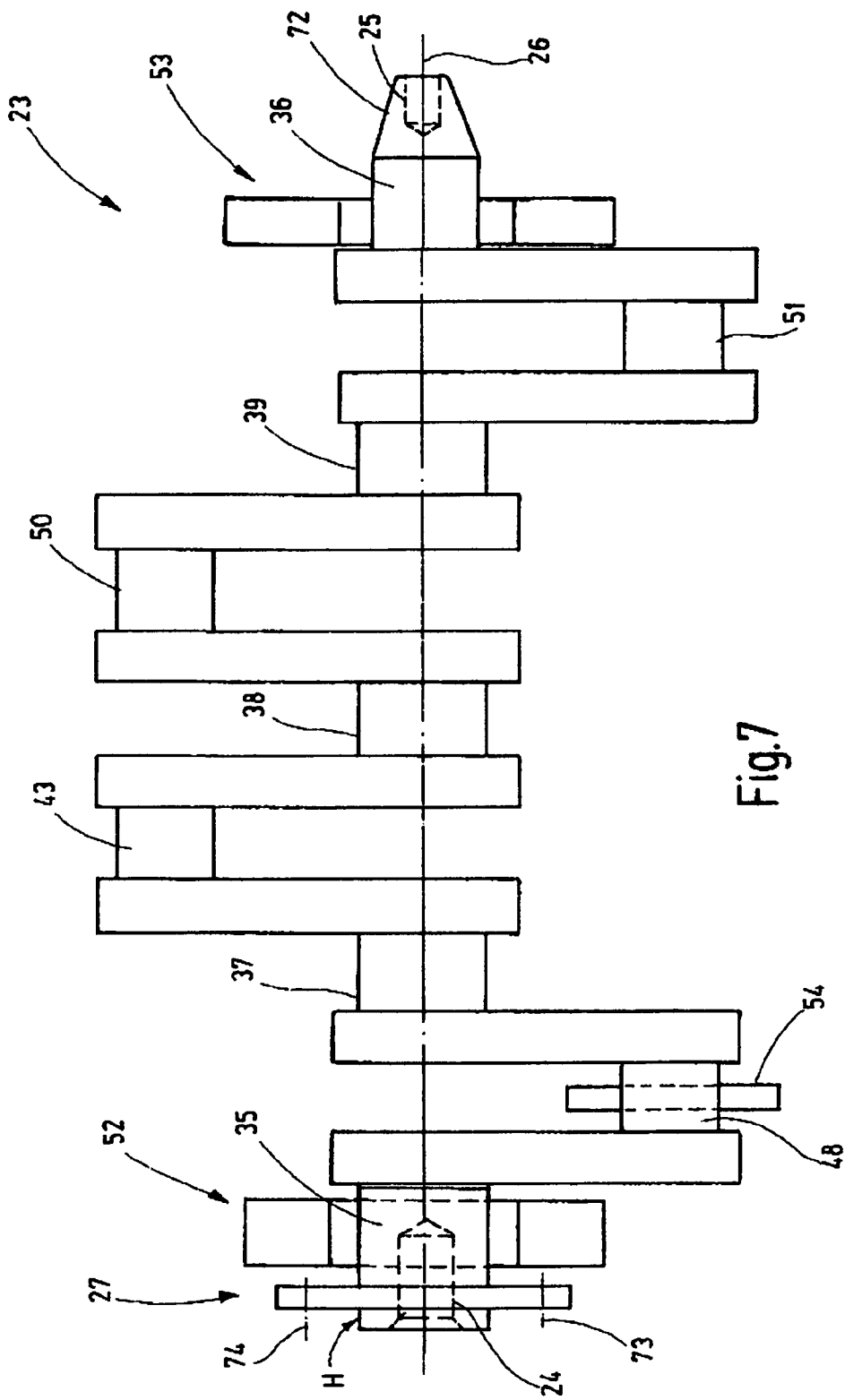
FIG. 7 shows, in a top view, the crankshaft according to FIG. 2 during machining of the flange and the shaft end piece.

The machining center 1 according to FIG. 1 may also be equipped for performing a second machining sequence. Then it forms in a manufacturing line, for example, the subsequent second machining center. The workpiece carrier 5 then includes at least two prism clamping systems 52, 53 which are indicated in FIG. 7 schematically and which support the crankshaft 23 preferably by the first and the last main bearing 35, 36. The flange 27 at a first end of crankshaft 23 and an often cylindrical end piece 72 at the opposite end (eventually provided with a conical end section) remain free. The prism clamping systems 52, 53 each include a lower prism member which is indicated in FIG. 7 and into which the crankshaft 23 is placed. An upper prism member, which is not shown, or another biasing member is placed on top of the crankshaft 23 and biases the respective main bearing 35, 36 into the lower prism. The clamping occurs without sliding movement between the respective clamping surfaces and the main bearings 36. For defining the angular position furthermore, an additional engagement or clamping system 54 may be provided at a crank bearing, preferably the first crank bearing 48, which is disposed adjacent the first main bearing 35 and which firmly engages the crankshaft for facilitating the determination of the angular position of the crankshaft 23. Also, centrally clamping systems may be provided which have suitable material combinations (soft engagement jaws or prisms).

With the two correspondingly modified machining centers according to FIG. 1, the crankshaft 23 after having been machined roughly and possibly hardened is subjected to a fine machining procedure which results in an accurately dimensioned crankshaft which installation only needs to be treated by a superfinish for generating the desired surface quality. This procedure is performed as follows:

The roughly pre-machined crankshaft 23 has the desired dimensions with a small excess which is shown in FIG. 5 for a main bearing by a dashed line in a highly exaggerated way. It may have a certain small eccentricity and a roundness deviation which are not shown. The average excess in dimensioning is in the area of a few tenths of a millimeter. As shown in FIG. 2, the crankshaft 23 supported between the tips 21, 22 is now rotated (very) slowly, for example, at a speed of a few turns per minute, around the crankshaft axis 23. The spindle 18 with the front face cutter 31, on the other hand rotates at a speed of, for example, 4000 or 5000 rpm (revolutions per minute) or even faster.

Figure 3:
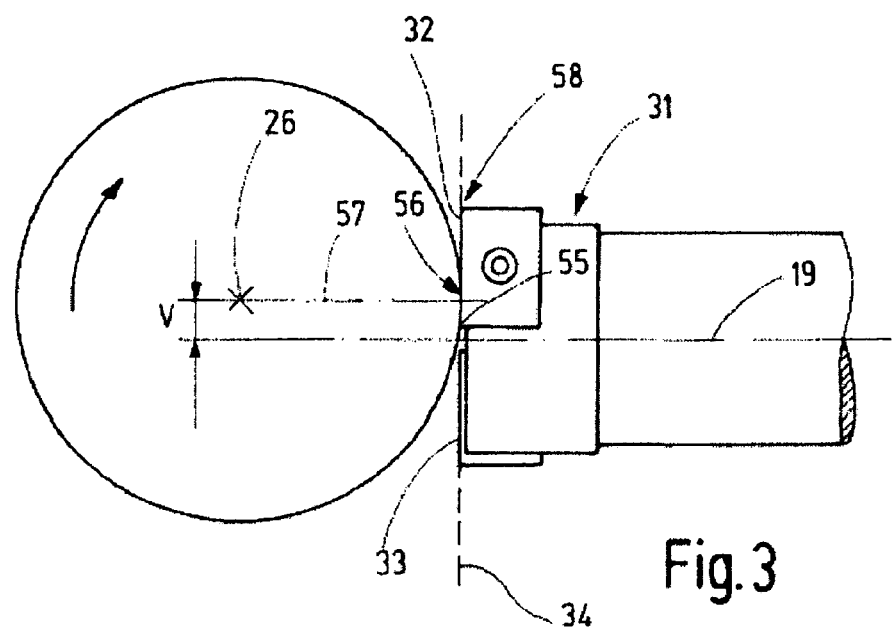
FIG. 3 shows schematically a main bearing during the orthogonal rotation milling machining.
Figure 4:
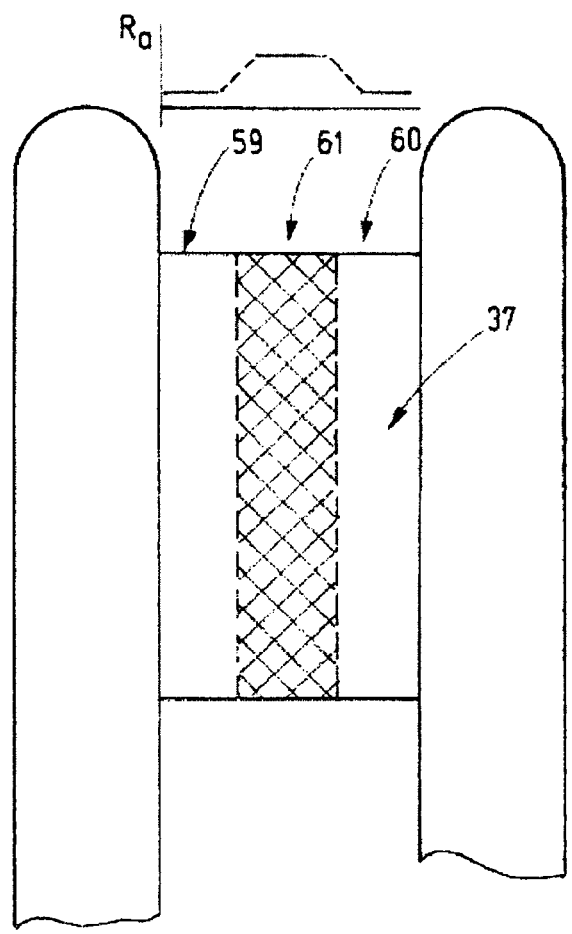
FIG. 4 shows the main bearing according to FIG. 3 after the machining in a schematic top view.
Figure 6:
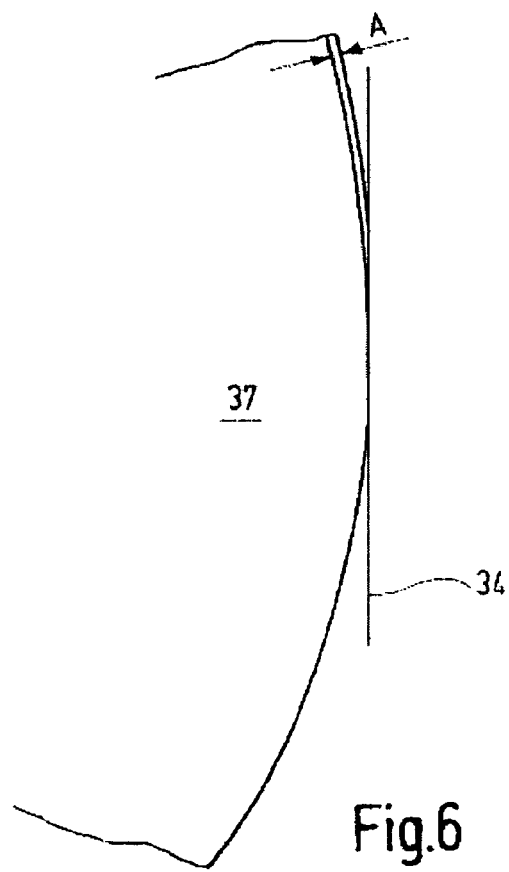
FIG. 6 shows the crank bearing according to FIGS. 3 to 5 during machining in a sectional exaggerated illustration.

The main bearing 37 of the crankshaft 23 is then by a short movement in the Z-direction put into engagement with face cutter 31 and is slowly rotated by exactly one turn without additional Z-adjustment. The rotation of the crankshaft 23 is started at the moment when the face cutter 31 comes into engagement with the crank bearing 37. Alternatively the milling tool 30 can be brought into contact with the already rotating crankshaft 23. This avoids form errors resulting from different loads on the crankshaft 23. When the turn is completed, the crankshaft still turning, is moved away from the face cutter 31. Care has to be taken, that the face cutter 31 is in contact with the crank bearing 37 for a full turn thereof, but not more than a turn. The excess material is removed in the process all in one turn and the bearing surface of the crank bearing 37 is finish-machined during this time. During this process, the spindle axis 19 is slightly displaced with respect to the crankshaft axis 26 by a distance V as shown in FIG. 3. This distance V is greater than the distance between an inner cutting corner 55 of the cutting edge 32 from the spindle axis 19. The speed of the face cutter 31 is so selected that at its inner cutting edge corner 55 or respectively the point 56 where a line 57 extending parallel to the spindle axis 19 and though the crankshaft axis 26 intersects the cutting edge 32, is greater than 20 m/min (meters per minute) and preferably greater than 100 m/min. At the outer cutting edge corner 58, the cutting speed may be 1000 m/min or more. The material is removed along a plane 34 which is also shown in FIG. 6 to show the small size of the excess dimension A. During machining a cylindrical bearing surface is produced as shown in FIG. 4 for the main bearing 37, which depending on the size of the distance V has a roughness property as indicated schematically in the diagram in the top part of FIG. 4. The roughness Ra is small in the outer annular areas 59, 60, preferably very small, that is smaller than 2 to 1 micrometer. In a central annular area 61 however, the roughness is greater, for example, than 2 micrometers or even greater than five micrometers. This roughness distribution provides for a main bearing 37 with high bearing load particularly in the outer areas of the bearing.

The machining does not need to be completed in a single turn of the crankshaft 23. As indicated in FIG. 5, particularly where a somewhat larger amount of excess material needs to be removed, in a first turn a certain material thickness can be removed which leads to a profile 62 which is unround and may be the result of different rigidities of the crankshaft 23 or of the machining center 1 in different radial directions. Unlike in a grinding procedure, the bearing surface of the main bearing 37 is not formed in a plurality of turns of the crankshaft 23. Rather the criterion is that the material layer being removed should have a certain minimum thickness. However a cut of a larger thickness material layer generates a greater force effective radially on the crankshaft 23. Whereas with grinding the engagement force can be reduced toward the end of the grinding procedure to almost zero which is called "final sparking". This is impossible in connection with cutting operations with a geometrically determined cutting edge. It is therefore possible that with the first milling turn, the unround profile 62 as shown in FIG. 5 which has, for example, two or several maxima or minima is generated. This problem occurs often in connection with the particular series of crankshafts because of the design-related different radial rigidities. In such cases, the profile 62 is determined. This can be done during the machining of the crankshaft taking periodically at certain times or incidentally sample measurements, possibly also only during the initial operation of the milling machine specifically for a particular type of crankshaft. Measurements can be taken using a measuring device installed in the machining spindle (18) of the machining center, for example. When the profile 62 is determined, a compensation movement based thereon is calculated whereby in a subsequent milling step the unroundness is compensated for by a corresponding slight position adjustment of the milling tool 30. In a second milling step, which again involves a single turn of the crankshaft, the desired profile is then obtained. The adjustment movement and the slight elastic bending movement of the crankshaft 23 then result in an engagement of the bearing area at an accurate circle around the center axis of the crankshaft thereby forming an exactly circular bearing surface.

It is also possible to generate the desired profile 63 in a single pass if the typical roundness deviations which have been determined during the initial machining of a particular crankshaft type are known and compensation adjustments are introduced already at that time.

The described roundness deviation can be assumed to be a waviness with a large wave length (macroscopic wave length). The wave length is, for example, an integral number fraction of the circumference wherein the integral number is relatively small, for example, less than 20. There may additionally be a waviness which may result from a relative movement between the cutting edge and the workpiece. This waviness, however, is comparatively very small. It is based on the ratio of the rotational speed of the crankshaft 23 and that of the milling cutting tool 30. Preferably, the kinematic wave length is so short that the wave depths formed thereby are less than the roughness depths. The kinematic wave length depth variations are, so to say, swallowed by the "static" of the surface roughness.

The described machining procedure can be used for all main bearings 35 to 39 in a corresponding way. This also applies to the crank bearings 48-51 wherein these bearings are machined while the crankshaft axis 26 machine spindle axis 19 are moved herein the workpiece carrier 5 and the carriage 16 are moved relative to each other with a sine oscillation and 90° phase displacement, so that the respective crank bearing 48 to 51 moves vertically up and down and the carriage 16 follows this movement. During this process, the axis displacement V is maintained as constant as possible. It is however possible to vary the axis displacement V during the machining of the crank bearing 48 to 51 as well as during the machining of the main bearings 35 to 39 which the crankshaft is turned in order to obtain along the circumference of the annular area 61 and possibly also the outer annular areas 59, 61 different degrees of roughness. Also certain form effects such as densifications can be provided or prepared thereby, if those are worked out during final super-finishing on the basis of the differently formed bearing load sections. Further during the machining of the centric bearings (35-39) of the shaft (23) the machine spindle (18) having tool (30) operatively mounted desirably executes a vertical follow movement and the shaft (23) a horizontal compensation movement which are tuned to each other so as to provide the desired surface shape. The vertical follow movement and the horizontal compensation movement follow in each case a sine or, respectively, a cosine oscillation and are superposed to provide a circular movement. Preferably in compensation for temperature influences a spindle (18) growth compensation is performed. Also, desirably, the speed of the milling tool (30) is selected to be above the critical frequency of the shaft (23) or excitable secondary vibrations.

The crankshaft 23 is actually very rigid for the machine milling operations to be performed, its elasticity is rather small. However, also the elasticity of the machining center may play a role which has to be taken into consideration and can be compensated for by the measures described above.

Figure 8:
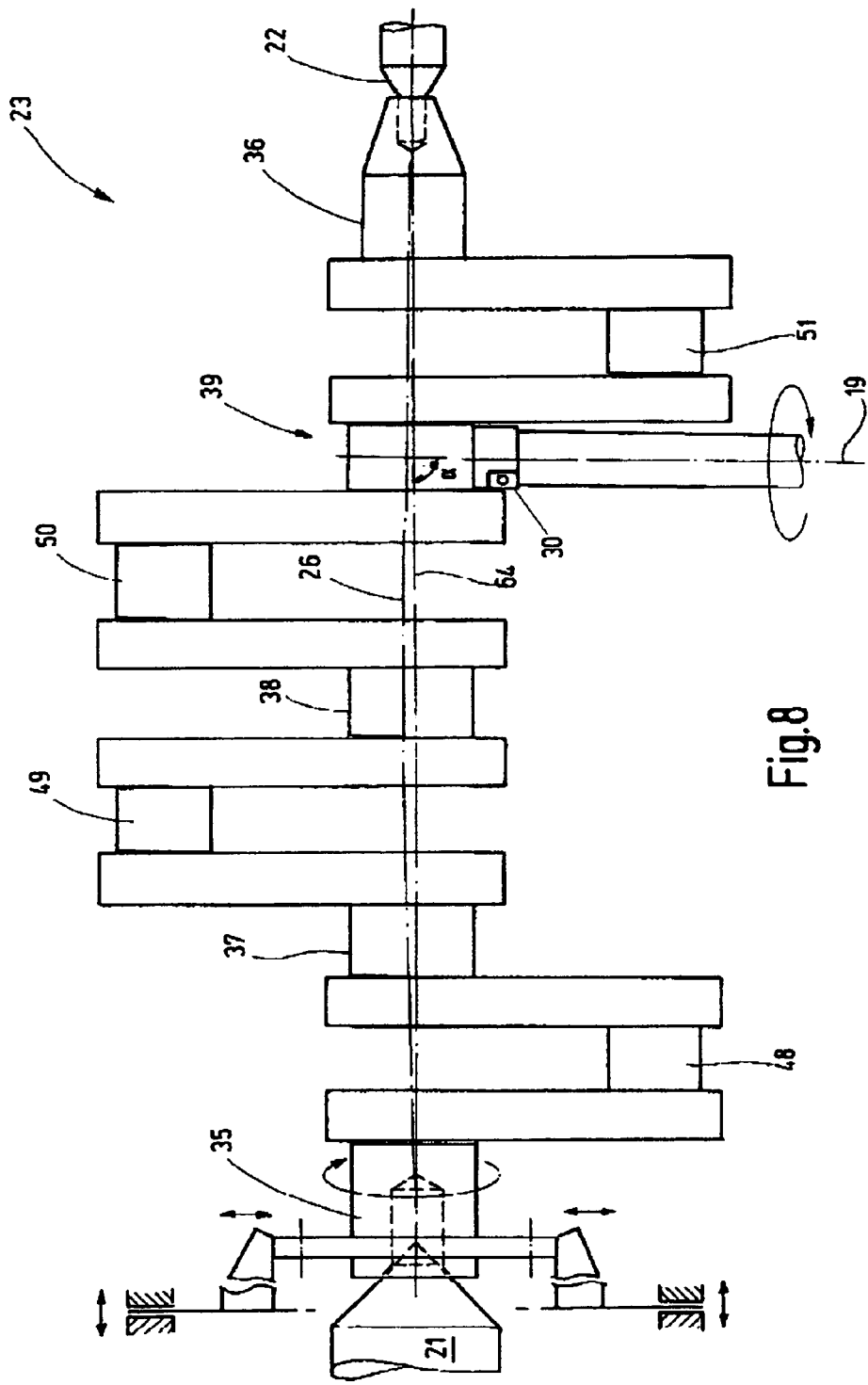
FIG. 8 is a schematic top view of the crank shaft in a machining process as shown in FIG. 2, but with the use of bending compensation means.

As shown in FIG. 8, the small flexibility of the crankshaft 23 may still provide for a deflection during milling even if the crankshaft is supported additionally by support members which of course are not infinitely rigid either. The crankshaft axis 26 is slightly bent by the engagement force of the milling tool 30 and therefore deviates from the ideal axis or connecting line 64 between the tips 21, 22. It is noted however that the main end bearings are not displaced radially, but extend at a slight pointed angle with respect to the ideal connecting line 64 between the tips 21-22. In order to still obtain a cylindrical bearing surface, the spindle axis 19 can as shown in FIG. 8, be oriented at an angle α with respect to the connecting line 64 which is slightly less than 90°. Preferably, it is less than 90° by that angle which the crankshaft axis 26 and the connecting line 64 form at the respective bearing. In FIG. 8 this is shown for the main bearing 39. The exact orientation of the crankshaft axis 26, that is of the connecting line 64, can be determined once or repeatedly before the machining by sensors detecting the orientation of reference surfaces near the tips 21, 22. If an inclination of the connecting line 64 is detected, it can be compensated by an appropriate movement of the carriages 7 or 8.

Figure 9:
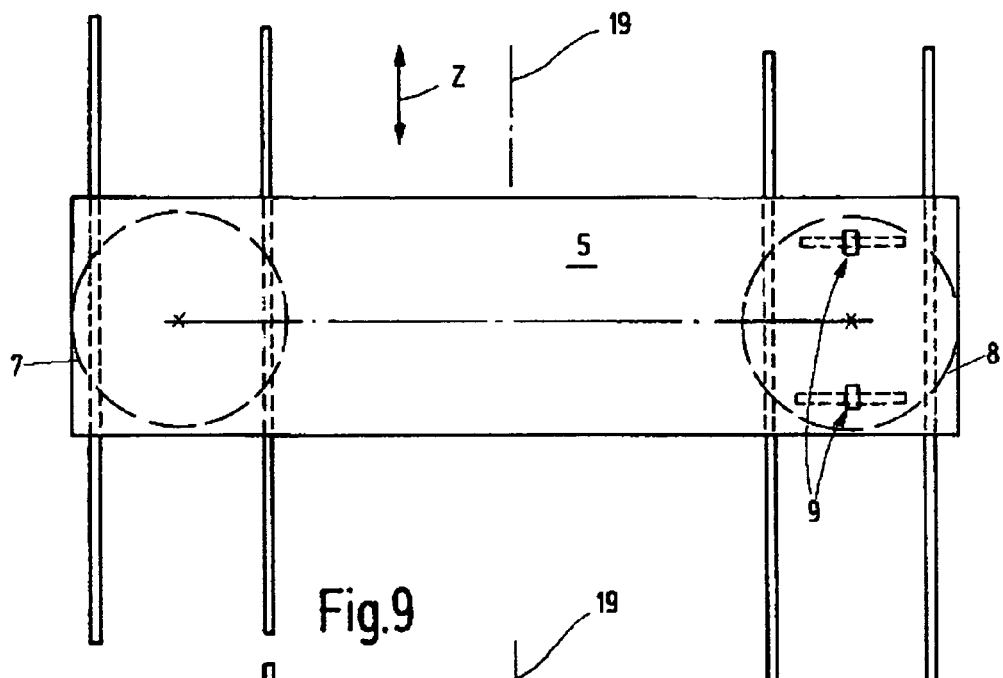
FIG. 9 and FIG. 10 are top views showing in simplified schematic views the workpiece carriages of the machining center of FIG. 1.
Figure 10:
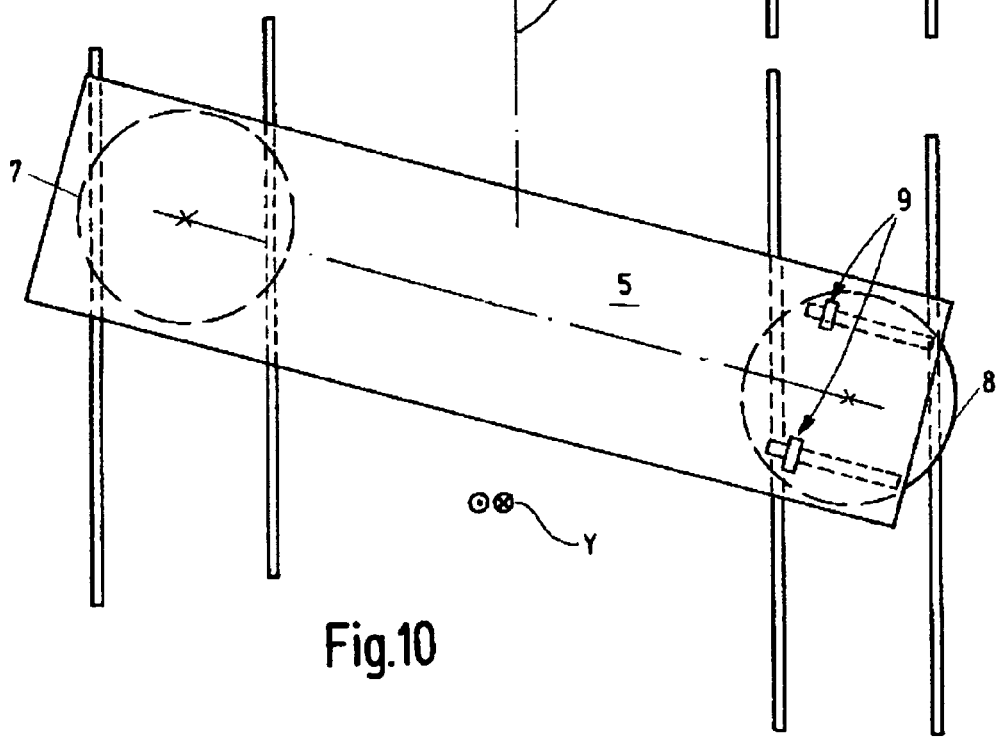

The inclination of the crankshaft 23 can be achieved by a differing control adjustment of the control motors 10, 11. This is shown schematically in FIGS. 9 and 10. It makes not only an adjustment of the workpiece carrier 5 in the Z-direction possible but, as shown in FIG. 10, permits also tilting of the workpiece carrier 5 around an axis which extends normal to the drawing plane of FIGS. 9 and 10, that is the Y-direction. Although, in the present case only very little angle corrections of, for example, a few angular minutes or degrees are needed, the length compensation arrangement 9 is such that substantial inclinations of the crankshaft 23 can be obtained, for example, for the drilling of inclined bores or the machining of inclined seating surfaces, for example, for oil bore plugs on the crankshaft.

As already mentioned, the milling tool 30 machines the cylindrical bearing surface of the respective main bearing 35-39 or of the crank bearing 48 to 51 in each case preferably over the whole width. This is specifically shown in FIGS. 11 to 14 in a more detailed manner. The milling cutter 30 or, respectively, the front face cutter 31 is illustrated in these figures schematically based on its contour.

Figure 11:
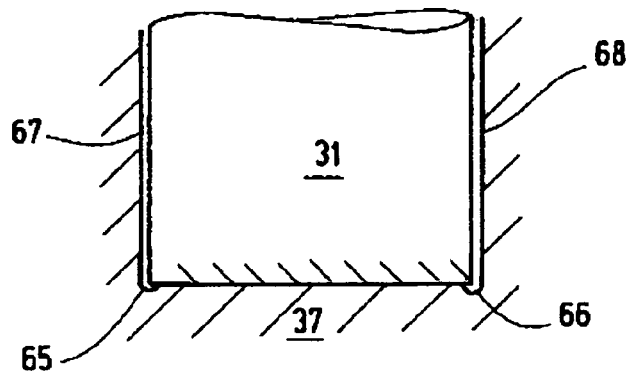
FIGS. 11 to 13 show schematically various possibilities for the main and crank bearing milling wherein the shading on the workpiece indicates the cutting edges of the cutting tool in engagement with the workpiece.

As example for the machining again, the main bearing 37 is used which is also shown only schematically in a partial sectional view. In connection with crankshafts as shown in FIG. 11 which includes clearance cuts 65, 66 the cylindrical bearing surface of the main bearing 37 ends before the adjacent oppositely disposed oil flange surfaces 67, 68. Only the cylindrical bearing surfaces of the main bearing 37 are machined in this case, not at the same time as the oil flange surfaces 67, 68. Those surfaces can be machined, if desired, with the same set-up and, possibly, the same milling tool or other milling tools which are then moved, like the front-face cutter 31, between the oil flange surfaces 67, 68 for machining these surfaces without however coming into contact with the cylindrical bearing surface. This applies particularly to crankshafts for passenger car engines. The fine machining is preferably performed in at least one of a first machining sequence and a second machining sequence with an advancement movement in the circumferential direction of not more than 0.5 millimeter per cutting edge and preferably only 0.1 millimeter per cutting edge. Preferably the fine machining in a first machining sequence and a second machining sequence is performed during not more than three shaft turns with a maximum roundness deviation of not more than 60 micrometers. Preferably during the fine machining in at least one of a first machining sequence and a second machining sequence at least 1000 bevels, preferably more than 2000 bevels are formed.

Figure 12:
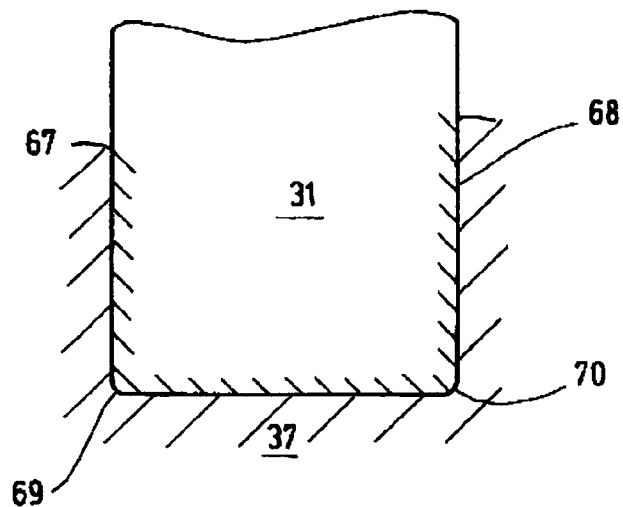

FIG. 12 shows a milling machining set up as it may be used in connection with crankshafts without clearance cuts 65, 66. The oil flange surfaces 67, 68 are disposed directly adjacent the cylindrical bearing surface of the main bearing 37. In this case, the finish machining of the cylindrical bearing surfaces and the adjacent corner areas and also of the oil flange surfaces 67, 68 occurs all at the same time. This can be done, for example, in connection with crankshafts for large engines.

Figure 13:
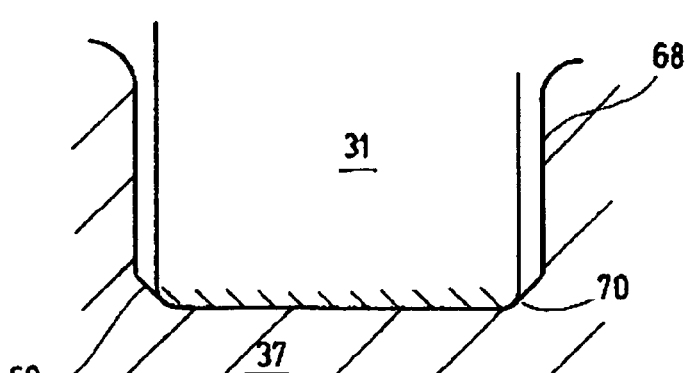
Figure 14:
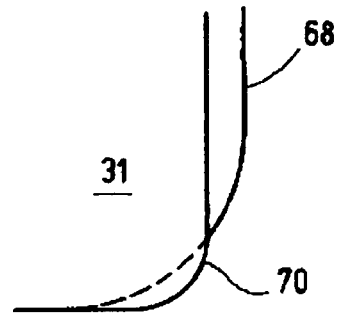
FIG. 14 shows an enlarged detail of the tool and FIGS. 15 to 17 show schematically further possibilities for the milling machining of the main or crank bearings wherein the shading shown on the tool indicates the cutting edges in engagement with the workpiece.

Alternatively, as shown in FIGS. 13 and 14 for large crankshafts only, the cylindrical bearing surface may be machined with the milling cutter. The curved corner areas 69, 70 are only clarified by the cutting edge ends of the face cutter 31. The oil flange surface 68 is not contacted.

Figure 15:
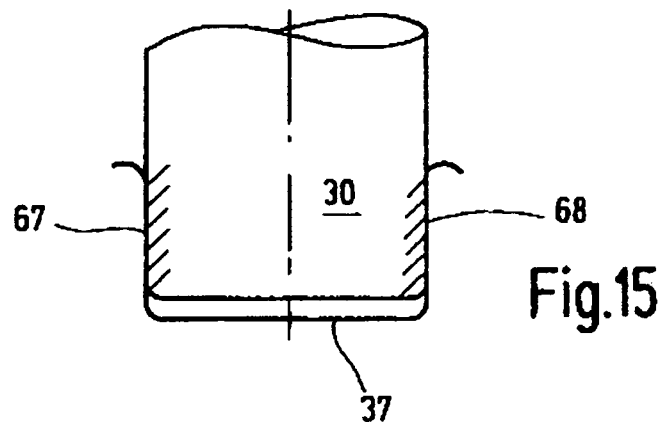

FIG. 15 shows another possibility for the simultaneous machining of the two oil flange surfaces 67, 68 which corresponds to a large extent to the variant according to FIG. 12. However, in this case the milling cutter 30 is in contact with the oil flange surfaces only with its circumferential cutting edges; its front face cutting edges are not in contact with the cylindrical bearing surface.

Figure 16:
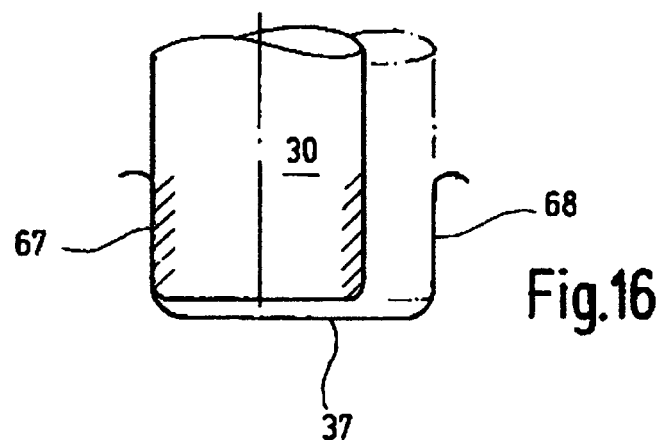

FIG. 16 shows another modified version for machining the main or crank bearings. A cutting tool 30 is used whose diameter is smaller than the distance between the two oil flange surfaces 67, 68. These surfaces are machined one after the other wherefor the cutting tool is correspondingly moved sidewardly (indicated in FIG. 16 by dash-dotted lines). The two oil flange surfaces 67, 68 can be machined with different directions of rotation of the camshaft so that both are machined either in the direction of movement of the oil flange surfaces or in the counter direction. Machining in the direction of movement of the flange surfaces is preferred because the cutting edge removes the maximum layer thickness which reduces tool wear.

Figure 17:
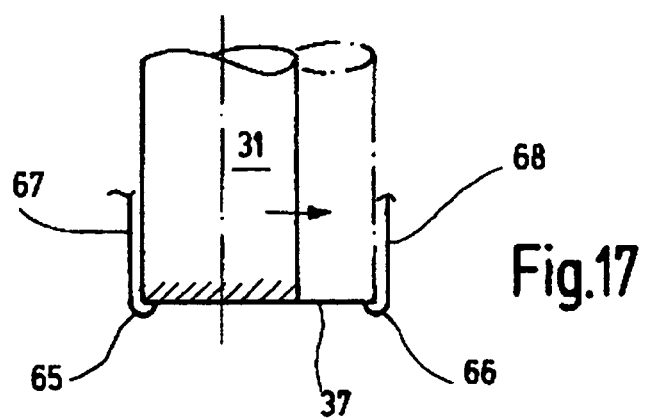

FIG. 17 shows a further modified version of the main or crank bearing machining procedure which is related to the procedure according to FIG. 11. Here a front face cutter 31 is used whose diameter is smaller than the axial length of the cylindrical surface of the main bearing 7. The front face cutter 31 is moved sidewardly during the cutting operation (indicated in FIG. 17 by the dash-dotted lines). The crankshaft 23 and the front face cutter 31 are axially moved relative to each other after at least one turn of the crankshaft 23, whereby then cutting occurs along a spiral line along the cylindrical bearing surface. This method is suitable for cutting bearings of different width with the same cutting tool 30. This reduces the need for various differently sized tools.

In the machining procedures described so far, the main bearings 35 to 39 and the crank bearings 48 to 51 are machined. If desired, however, also the outer flange diameter may be machined particularly, if the clamping chuck 28 does not engage the flange 27, but an adjacent surface 71 (alternative to FIG. 2). In this case, the main and crank bearings are machined to the given dimensions. In the subsequent second machining sequence which may also be performed in a machining center according to FIG. 1, the crankshaft is supported in the way as shown in FIG. 7. To this end, the machine center includes, for example, a rotating table on which the crankshaft 23 is mounted with its longitudinal direction extending in the Z-direction. The crankshaft 23 may also be rotated by 180°, so that it is disposed selectively with the flange 27 or with the shaft end 72 in front of the machining spindle 18. Only the shaft end piece 72 and possibly the surface 71 as well as the shaft end bore 25, the needle bearing bore 23 and the flange bores 73, 74 (and other flange bores) are machined, which are indicated in FIG. 7 only by their center lines. The crankshaft 23 is preferably supported such that the crankshaft axis 26 extends parallel to the spindle axis 19. Furthermore, as already mentioned, the inclined bores, such as oil passages, can be drilled by a moving workpiece carrier 5 to the respective inclined positions. The machining of the outer surface of the shaft end 72 is performed preferably with a milling cutter which has only one cutting edge for inner or outer circular cutting and which is moved in a spiral line along the shaft end piece 72.

With the machining sequence as described above, the prior art grinding procedure can be completely omitted from crankshaft manufacturing process. The fine machining is preferably performed by orthogonal milling cutting in a dry operation wherein all main bearings and crank bearings are machined in a single support arrangement from the rough machining to a particular end dimension. In a second machining sequence some of the main bearings and the crank bearings are then used as supporting surfaces, so that chain-dimensioning is avoided. The compensation procedures compensating for the flexibility of the crankshaft 23 provides for accurately dimensioned machining of the bearing surfaces also in connection with large-volume manufacturing conditions.

What is claimed is:

1. A method for fine-machining crankshafts (23) which has at least a first and a last centric bearing (35, 36), at least one eccentric bearing (48), a first end (27) and an opposite end (72), comprising the steps of:
   fine machining in a first machining sequence, the roughly machined or roughly machined and hardened crankshaft (23), the centric bearings (35, 36) and the eccentric bearing (48) with a geometrically determined cutting edge (32) of a milling cutting tool (30) with a single mounting of the crankshaft (23); and,
   in a second machining sequence, fine machining the crankshaft whose centric bearings (35, 36) and eccentric bearing (48) have been fine-machined, in a single mounting the ends of the crankshaft (23) using a geometrically defined cutting edge (32) of the milling tool (30) for the fine cutting of the crankshaft surfaces.

2. The method of claim 1, wherein the first machining sequence is performed in a first machining center (1) and the second machining sequence is performed in a second machining center (1).

3. The method of claim 1, wherein the first machining sequence and the second machining sequence are performed in a single machining center.

4. The method of claim 1, wherein during the fine machining an average cutting speed of at least 300 meters per minute to 400 meters per minute is used.

5. A method for fine-machining a roughly pre-machined non-hardened or hardened shaft (23), the shaft (23) including at least a first and a last centric bearing (35, 36), at least one eccentric bearing (48), a first end (27) and an opposite end (72), comprising the steps of:
   fine-cutting the centric bearings (35, 36) and then at least one eccentric bearing (48) of the shaft (23) using a geometrically defined cutting edge of a milling tool (30), the fine cutting of each bearing surface being performed in not more than three rotations of the shaft (23) using a predefined cutting edge (32) for machining at the predetermined location in a single turn of the shaft (23).

6. The method according to claim 5, wherein bearing measurements are taken after a single turn of the shaft (23).

7. The method according to claim 6, wherein the bearing measurements are taken while the shaft is supported in a machining center (1).

8. The method according to claim 7, wherein the measurements are taken using a measuring device installed in a machining spindle (18) of the machining center (1).

9. The method according to claim 8, wherein a measurement of roundness deviations of the machined cylinder surfaces of the centric bearings (35, 36) and of the eccentric bearing (48) are determined.

10. The method according to claim 6, wherein with a measurement of roundness deviations of the machined cylinder surfaces of the centric bearings (35, 36) and of the eccentric bearing (48) are determined.

11. The method according to claim 10, wherein an expected value of the roundness deviations is determined.

12. The method according to claim 11, wherein between the shaft (23) and a machine spindle (18) an adjustment movement is executed which counteracts the expected roundness deviation.

13. The method according to claim 6, wherein each shaft (23) being machined is measured.

14. The method according to claim 6, wherein sample measurements are taken after the machining of a number of shafts (23).

15. The method according to claim 5, wherein bearing measurements are taken after two turns of the shaft.

16. The method according to claim 5, wherein bearing measurements are taken after the fine machining is completed.

17. The method according to claim 5, wherein the fine machining in a first machining sequence is performed at the same time over the whole length of a respective cylindrical area of the bearings (35, 36, 48).

18. The method according to claim 5, wherein in at least one of a first machining sequence and a second machining sequence the fine machining is performed without adjustment movement of the milling tool (30) or the shaft (23).

19. The method according to claim 5, wherein the fine machining is performed in at least one of a first machining sequence and a second machining sequence with an advancement movement in a circumferential direction of not more than 0.5 millimeter per cutting edge.

20. The method according to claim 5, wherein fine machining in a first machining sequence and a second machining sequence is performed during not more than three shaft turns with a maximum roundness deviation of not more than 60 micrometers.

21. The method according to claim 5, wherein the fine machining in a first machining sequence and a second machining sequence up to a diameter deviation of not more than 100 micrometers is performed as a positive deviation will result in a desired contour after completion of a finishing step.

22. The method according to claim 5, wherein with the fine machining in at least one of a first machining sequence and a second machining sequence in no more than three turns of the shaft (23) an average roughness (Ra) of not more than 2 micrometers is generated.

23. A method for the fine machining of a shaft (23) including at least a first and a last centric bearing (35, 36), at least one eccentric bearing (48), a first axial end (27) and an opposite axial end (72), comprising a machining sequence wherein a roughly machined and rolled shaft (23) or a roughly machined and hardened and rolled shaft (23) is supported at its centric bearings (35, 36) and then at least one eccentric bearing (48) including a bearing surface having a central annular area (61) and axial outer areas (59, 60) is machined using a geometrically defined cutting edge (32, 33) of a milling cutting tool (30) for cutting material from the bearing (48) surfaces, the milling tool (30) including an axis of rotation (19), and the central annular areas (61) of the bearing surfaces of the eccentric bearings (48) are provided with a roughness (Ra) which differs from the roughness at the axial outer areas (59, 60) of the bearings (48).

24. The method according to claim 23, wherein the shaft (23) is one of a camshaft wherein the centric bearing is formed by an outer circumference of the camshaft and a crankshaft (23) wherein the centric bearings (35, 36) is a main bearing (35, 36) and at least one eccentric bearing (48) is a crank bearing (48) and the ends (27, 72) of the crankshaft include a flange (27) with bores (73, 74) and an end piece (72).

25. The method according to claim 23, wherein the roughness (Ra) of the axial end areas (59, 60) is at least twice that of the annular center areas (61).

26. The method according to claim 23, wherein the roughness (Ra) in the annular center areas (61) is at least twice that of the axial end areas (59, 60) of a bearing surface.

27. The method according to claim 26, wherein the roughness difference between the annular center area (61) and the axial outer areas (59, 60) is so large that after the fine milling a roughness difference is still present.

28. The method according to claim 23, wherein the roughness (Ra) in the annular center area (61) is larger than 2 micrometers.

29. The method according to claim 23, wherein the roughness (Ra) outside the annular center area (61) is smaller than 5 micrometers.

30. The method according to claim 23, wherein the fine machining in at least one of a first machining sequence and a second machining sequence is performed with cutting edges (32, 33) disposed in one plane.

31. The method according to claim 23, wherein during the fine machining in at least one of a first machining sequence and a second machining sequence at least 1000 bevels.

32. The method according to claim 23, wherein during the fine machining in at least one of a first machining sequence and a second machining sequence in each case a waviness of less than 1 micrometer.

33. The method according to claim 23, wherein during the fine machining in a first machining sequence the cylindrical surfaces of the centric bearings (35, 36) and of the eccentric bearings (48) are formed with an angle deviation of less than 0.5°.

34. The method according to claim 23, wherein during the fine machining in a first machining sequence the cylindrical surfaces of the centric bearings (35, 36) and of the eccentric bearings (48) are machined with a form deviation of less than 0.4%.

35. The method according to claim 23, wherein, if the surface areas of the centric bearings (35, 36) and the eccentric bearings (48) are provided with a camber, the surface areas are first machine-cut cylindrical within a machining accuracy range and the camber is applied in the subsequent finishing machining.

36. The method according to claim 23, wherein the milling tool (30) includes at least one front face cutter (31), a fine machining is performed by milling using the milling tool (30) with the at least one front face cutter (31) arranged in a plane (34) which extends normal to the axis of rotation (19) of the milling tool (30).

37. The method according to claim 23, wherein a fine machining occurs by milling using the milling tool (30) with at least one cutting edge (32) which is disposed on a conical surface which is concentric with the axis of rotation (19) of the milling tool (30).

38. The method according to claim 37, wherein the cone angle is greater than 170°.

39. The method according to claim 23, wherein a fine machining is performed by orthogonal milling wherein the axis of rotation (19) of the milling tool (30) is oriented at a right angle to an axis of rotation (26) of the shaft (23).

40. The method according to claim 39, wherein the fine machining is performed by orthogonal milling wherein the axis of rotation (19) of the milling cutter (30) extends at a right angle to the axis of rotation (26) of the shaft (23) with an axial displacement (V).

41. The method according to claim 40, wherein the axial displacement (V) is set to a certain value for providing a desired roughness difference between the central annular area (61) of the eccentric bearing (48) and the axially outer areas (59, 60) thereof.

42. The method according to claim 23, wherein the milling tool (30) includes at least two cutting edges (32, 33) which are disposed in a common plane (34) extending normal to the axis of rotation (19) of the milling tool (30).

43. The method according to claim 23, wherein the shaft (23) has a predetermined speed of rotation, the milling tool (30) is driven at a speed which is at least 500 times the speed of rotation of the shaft (23).

44. The method according to claim 23, wherein the shaft (23) is supported during a first machining sequence between two tips (21, 22) which are received in axial end bores (24, 25) which are centered on a straight line (64).

45. The method according to claim 44, wherein the straight line (64) extends for the machining of the centric bearings (35-39) and the eccentric bearings (48-51) normal to the axis of rotation (19) of the milling tool (30).

46. The method according to claim 44, wherein the straight line (64) is arranged for the machining of the centric bearings (35-39) and the eccentric bearings (48-51) so as to extend at an angle ($\alpha$) with respect to the axis of rotation (19) of the milling tool (30) compensating for a bending of the shaft (23) during machining.

47. The method according to claim 46, wherein an angle ($\alpha$) is the angle adapted to the elasticity of the shaft (23) at a respective angular position of the shaft (23) during its rotation.

48. The method according to claim 23, wherein the shaft (23) is center mounted during a first machining sequence and a second machining sequence.

49. The method according to claim 48, wherein during the machining of the centric bearings (35-39) of the shaft (23) a machine spindle (18) having tool (30) operatively mounted executes a vertical follow movement and the shaft (23) a horizontal compensation movement which are tuned to each other so as to provide a desired surface shape.

50. The method according to claim 49, wherein the vertical follow movement of the machine spindle (18) and the horizontal compensation movement of the shaft (23) follow in each case a sine or, respectively, a cosine oscillation and are superposed to provide a circular movement.

51. The method according to claim 23, wherein in compensation for temperature influences a spindle growth compensation is performed.

52. The method according to claim 23, wherein a first machining sequence as well as a second machining sequence is performed with dry machining.

53. The method according to claim 23, wherein the speed of the milling tool (30) is selected to be above a critical frequency of the shaft (23) or excitable secondary vibrations.

* * * * *